Figures 1, 2, 3, 4, 5:
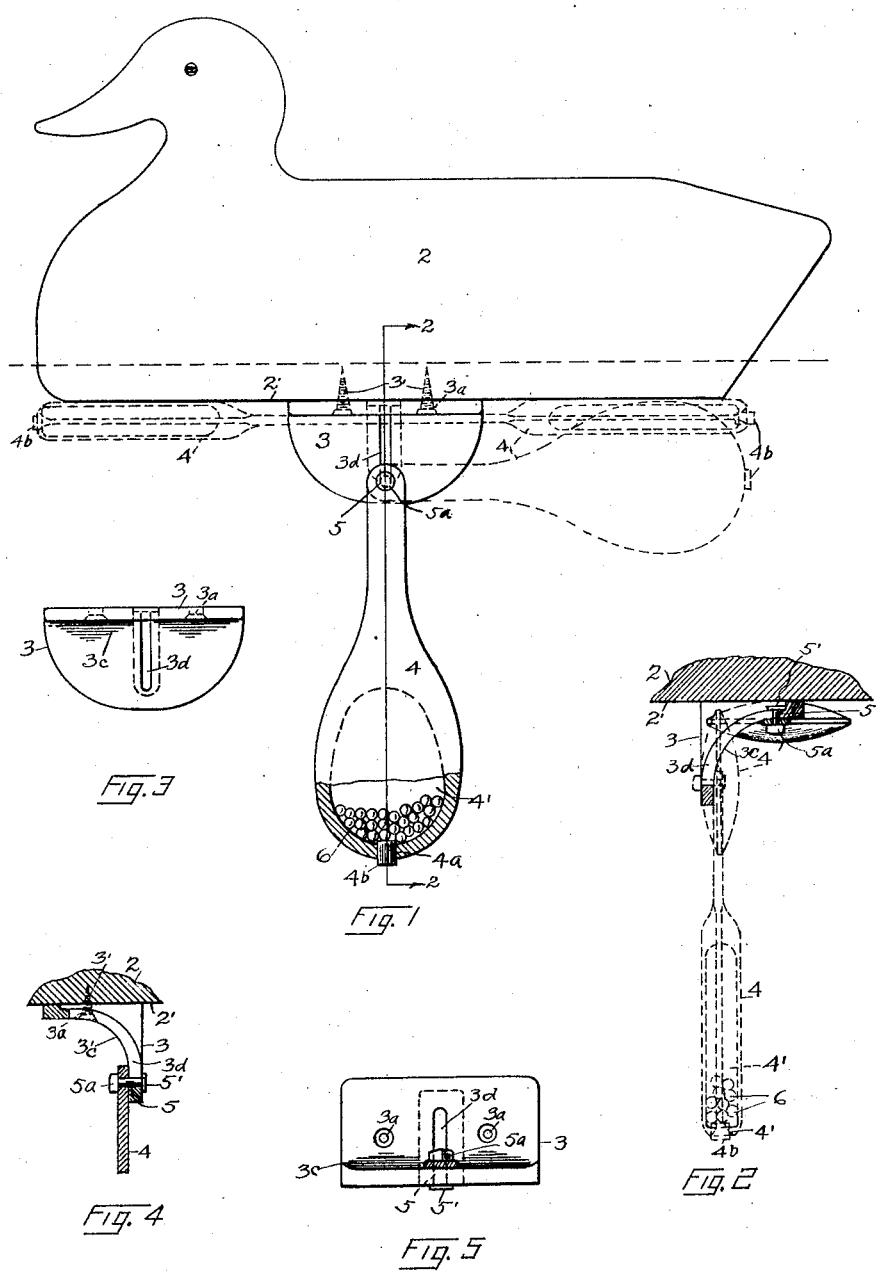

G. W. KLOCK.
COUNTERBALANCE FOR DUCK DECOYS.
APPLICATION FILED FEB. 28, 1921.

1,392,065.

Patented Sept. 27, 1921.

Inventor
GEORGE W. KLOCK.
Harry D. Wallace
Attorney

UNITED STATES PATENT OFFICE.

GEORGE W. KLOCK, OF SYRACUSE, NEW YORK.

COUNTERBALANCE FOR DUCK-DECOYS.

1,392,065.   Specification of Letters Patent.   Patented Sept. 27, 1921.

Application filed February 28, 1921. Serial No. 448,286.

*To all whom it may concern:*

Be it known that I, GEORGE W. KLOCK, a citizen of the United States, residing at Syracuse, in the county of Onondaga and State of New York, have invented certain new and useful Improvements in Counterbalances for Duck-Decoys, of which the following is a specification.

This invention relates to improvements in counter-balances for duck decoys and has for its object to provide a novel and simple device of the class, which is adapted for attachment to almost every style or make of decoys. A further object is to provide a counter-balance which is pivotally secured to a bracket and when in operative position hangs like and has the action of a pendulum, for stabilizing—preventing the violent bobbing or rocking of the decoy, as well as for preventing the capsizing of the decoy when the water is choppy and rough. A further object is to provide a novel bracket for securing the counter-balance, by means of which the counter-balance may be swung on its pivot and then folded horizontally beneath the body of the decoy, where the counter-balance is self-retained until the next operative period. And a further object is to provide novel means for increasing and for decreasing the weight of the counter-balance, in order to vary the buoyancy of the decoy.

I attain these objects by the means set forth in the detailed description which follows, and as illustrated by the accompanying drawing, in which—

Figure 1 is a side elevation of a decoy, to which my counter-balance is applied, showing by full lines and dotted lines the operative and inoperative positions of the counter-balance. Fig. 2 is a broken sectional view substantially on line 2—2 of Fig. 1; showing the counter-balance in full lines in the idle position, while the dotted lines show the various other positions of the same. Fig. 3 is a front side view of the bracket. Fig. 4 is a fragmentary section also taken on line 2—2 of Fig. 1, but viewed in the opposite direction to that of Fig. 2. And Fig. 5 is a bottom face view of the bracket.

In the drawing, the decoy is indicated by the numeral 2. The bottom 2' of the decoy is preferably flat as shown. 3 represents the bracket which supports the counter-balance 4. The bracket is substantially L-shaped in cross section, as best seen in Figs. 2 and 4, and may be secured to the bottom of the decoy by screws 3', which pass through perforations $3^a$, in the horizontal arm of the bracket. The rear and top sides of the bracket form a right angle, while the face or front side describes a curve or arc, as at $3^c$ (see Figs. 2 and 4). At the middle of the bracket is provided a slot $3^d$, which extends about an equal distance across each of the leaves of the bracket, and the top and rear faces of the bracket are cut away or counter-sunk in line with but to a greater breadth than the slot $3^d$, to receive and to provide clearance for the head 5' of a bolt 5, by which the counter-balance 4 is pivotally attached to the bracket. The body of the bolt 5 passes loosely through and plays in the slot $3^d$, and it also passes through the reduced upper end of the counter-balance 4, its opposite end usually being fitted with a nut $5^a$. The counter-balance 4 comprises an elongated part which gradually increases in thickness and breadth toward its lower end, and the latter portion is preferably cast or otherwise formed hollow, as at 4' and has a filling orifice or mouth $4^a$ at the extreme lower end, by means of which shot or other ballast 6 may be inserted for increasing or decreasing the weight of the counter-balance, and the shot may be held in place by a removable stopper or cork $4^b$.

The operation of my counter-balance is as follows: When the decoy 2 is placed in the water the counter-balance 4 is disposed vertically as shown by the full lines in Fig. 1, and by the dotted lines in Fig. 2, wherein the pivot bolt 5 is positioned in the lower end of the slot $3^d$, and the reduced top-end of the balance lies flat against the front face of the depending wing or the bracket 3. In this position the counter-balance may be swung forwardly and backwardly like a pendulum, if such action is required, but it cannot be swung laterally, unless moved by the lateral rocking of the decoy, owing to the flat seating of the top-end of the balance against the depending wing of the bracket. This provision tends to prevent the capsizing of the decoy during windy weather, as well as when the water is choppy and rough. When the decoy is removed from the water, the hunter takes hold of the free end of the counter-balance 4 and swings it either forwardly or backwardly, in the same plane it occupies while in the water, or to the position shown by the dotted lines

*a* in Figs. 1 and 2. He then gives the counter-balance a quarter twist, and at the same time exerts enough pressure or force to move the bolt 5 upwardly and then forwardly in the slot 3$^d$, until the body of the counter-balance lies flat against the under side of the decoy, as shown by dotted lines *x* in Fig. 1 and by the full lines in Fig. 2. This latter part of the folding operation is facilitated by the curved surface 3$^c$ and the disposition and arrangement of the head and nut of the bolt 5, which are applied loosely enough to permit of the ready twisting of the balance and yet prevent the same from canting and hindering the adjustment. When the balance 4 is finally disposed against the bottom of the decoy it tends to remain in that position because its reduced end is again provided with a flat seating at the opposite end of the slot 3$^d$, as described. To release the counter-weight, the last described operation is reversed.

Having thus described my invention, what I claim, is—

1. In a device of the class described, a pendulum counter-balance, the top end thereof being perforated, the lower end portion being hollow and adapted to contain more or less ballast for varying the buoyancy of said part, a bracket substantially L-shaped in cross-section, one arm of said bracket adapted to be secured to the bottom of a decoy the other arm of said bracket disposed vertically, said bracket having a transverse slot which extends partially across both of its arms, the hollow side of said bracket being curved to facilitate the folding of the counter-balance, and a bolt passing loosely through said slot and through the perforation of the counter-balance adapted to be moved from one end of said slot to the other during the folding-up of the counter-balance.

2. In a counter-balance for duck decoys, an inverted L-shaped bracket adapted to be attached to the bottom of a decoy, whereby one arm of the bracket lies flat against the decoy while the other arm of said bracket depends, said bracket having its front face curved, and having a transverse slot cut through the curved portion, and a countersunk portion at the top and rear sides coinciding with said slot, a counter-balance having its top end perforated, its bottom end having a chamber to receive ballast for increasing and decreasing its weight, and a bolt passing loosely through said slot and through the perforated end of the counter-balance, said bolt having a head which is received by and slides in the countersink of the bracket during the folding and unfolding operation.

3. A counter-balance for decoys comprising a bracket adapted to be secured to the bottom of a decoy, said bracket having a depending arm and provided with a transverse slot extending partway across said arm, an oscillatable counter-balance comprising an elongated part having its top end perforated, its opposite end being enlarged and provided with a hollow compartment adapted to receive ballast for varying the buoyancy of the decoy, and a bolt passing loosely through the top end of the counter-balance and also loosely through said slot, adapted to pivotally secure said counter-balance, said counter-balance adapted to be folded upwardly toward the bottom of the decoy and to be rotated a partial turn on the line of its longitudinal axis for disposing the counter-balance parallel to and in contact with the bottom of the decoy while the latter is idle.

In testimony whereof I affix my signature.

GEORGE W. KLOCK.